US010909196B1

(12) United States Patent
Suzuki et al.

(10) Patent No.: US 10,909,196 B1
(45) Date of Patent: Feb. 2, 2021

(54) INDEXING AND PRESENTATION OF NEW DIGITAL CONTENT

(71) Applicant: A9.com, Inc., Palo Alto, CA (US)

(72) Inventors: Keiichiro Suzuki, Redmond, WA (US); Kai Yuan, Seattle, WA (US)

(73) Assignee: A9.com, Inc., Palo Alto, CA (US)

( * ) Notice: Subject to any disclaimer, the term of this patent is extended or adjusted under 35 U.S.C. 154(b) by 416 days.

(21) Appl. No.: 15/905,600

(22) Filed: Feb. 26, 2018

(51) Int. Cl.
| | |
|---|---|
| *G06F 16/9535* | (2019.01) |
| *G06F 16/248* | (2019.01) |
| *G06F 16/958* | (2019.01) |
| *G06F 16/2457* | (2019.01) |

(52) U.S. Cl.
CPC ........ *G06F 16/9535* (2019.01); *G06F 16/248* (2019.01); *G06F 16/24578* (2019.01); *G06F 16/958* (2019.01)

(58) Field of Classification Search
CPC ....... G06F 16/30–374; G06F 16/24578; G06F 16/248; G06F 16/9535; G06F 16/958
See application file for complete search history.

(56) References Cited

U.S. PATENT DOCUMENTS

| | | | | |
|---|---|---|---|---|
| 7,895,227 B1* | 2/2011 | Henderson | ............. | G06Q 30/02 |
| | | | | 707/769 |
| 9,336,211 B1* | 5/2016 | Bousquet | ............. | G06F 16/951 |
| 9,378,276 B1* | 6/2016 | Mengle | ................. | G06F 16/951 |
| 2011/0161153 A1* | 6/2011 | Carvis | .................... | G06Q 30/02 |
| | | | | 705/14.25 |
| 2012/0278253 A1* | 11/2012 | Gahlot | .............. | G06Q 30/0201 |
| | | | | 705/347 |
| 2018/0218428 A1* | 8/2018 | Xie | ........................ | G06N 20/00 |
| 2019/0213608 A1* | 7/2019 | Ouyang | ............. | G06F 16/9535 |

\* cited by examiner

*Primary Examiner* — Robert W Beausoliel, Jr.
*Assistant Examiner* — Nirav K Khakhar
(74) *Attorney, Agent, or Firm* — Hogan Lovells US LLP

(57) ABSTRACT

Systems and methods are disclosed for a system configured to access first content to determine that textual features common to queries received in a website are available in text within the first content. An identifier within the first content is determined where the identifier references second content that comprises details associated with the textual features. In response to a content query including the textual features received in the website, display content is generated. The display content includes a first area to display matching content indexed from prior user searches and also includes a second area to be modified. A portion of the details and the identifier is provided in the second area.

18 Claims, 10 Drawing Sheets

INDEXING AND PRESENTATION OF NEW DIGITAL CONTENT

BACKGROUND

Cold start for new items refers to the unavailability of behavioral context for newly released items—either products or services. A computer and provided software are unaware of newly released items. As a result, content engines may not list new items in a content display, even if a user is seeking additional information for the newly released items based in part on their knowledge. While crawling is provided to index new webpages, an absence of context may render such a process meaningless. As result webpages are static, there may be no electronic real estate to support new item discovery. In addition, when the result webpages are static, they include content popular within the website to which the search is made—setting aside new content.

BRIEF DESCRIPTION OF THE DRAWINGS

Various embodiments in accordance with the present disclosure will be described with reference to the drawings, in which.

DETAILED DESCRIPTION

Figure 1:
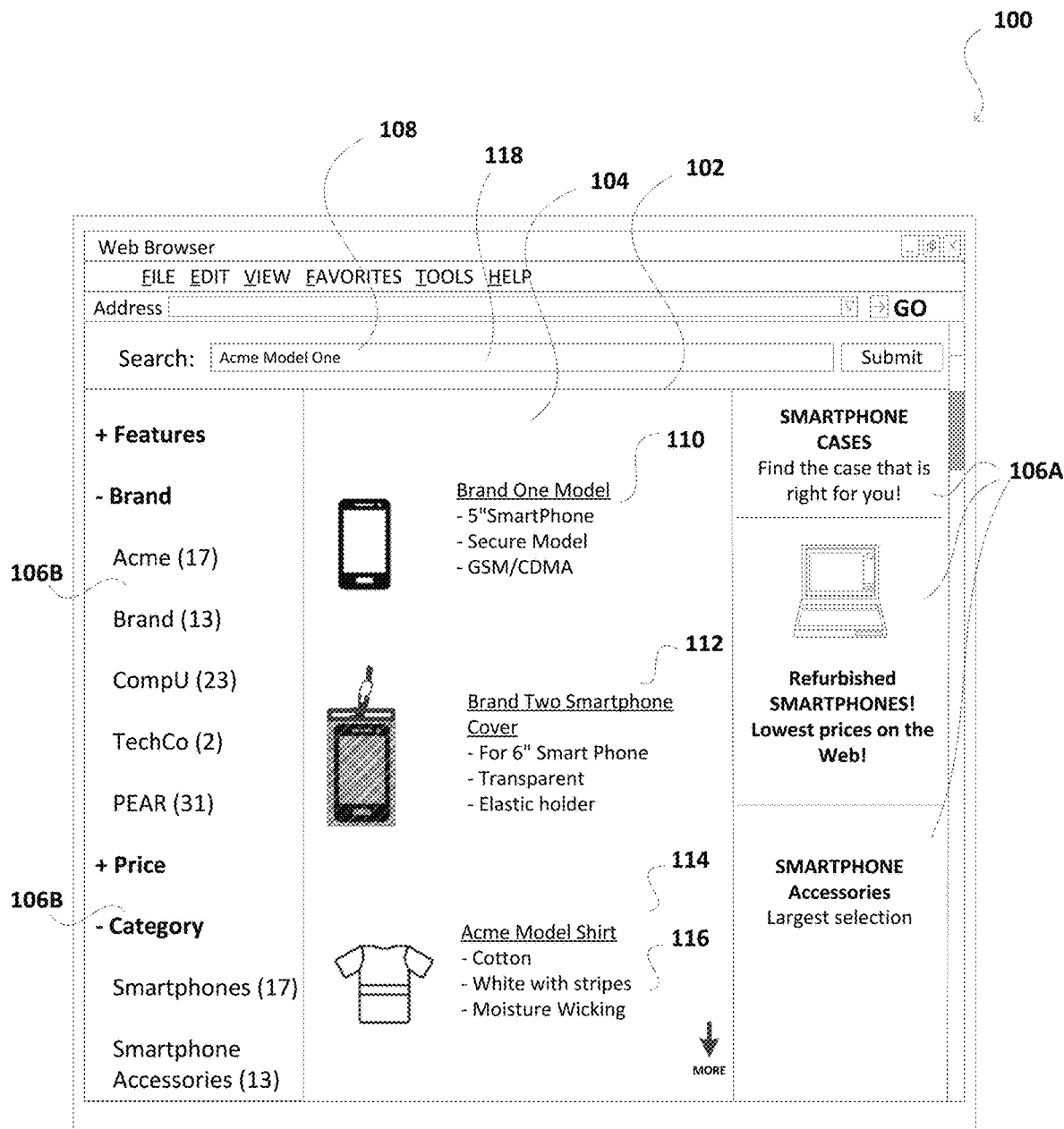
FIG. 1 illustrates an example of a window of display content that can be presented in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to indexing and providing content for newly released products in an electronic environment. In particular, the example systems and methods herein determine that a rate of receipt of queries at a website is higher than a rate threshold. Such a determination may be indicative of spike in interest in a new item from users aware of the new item. However, electronic media may suffer from information asymmetry and may not have the ability to contextually identify that new webpages relate to new items. The present disclosure provides configuration to a computer system that enables determination of the spike in interest, then enables crawling and analysis of news and social media content to determine that textual features common to the queries from the spike in interest are available within news or social media content. For example, a new product called MODEL ONE—a drone toy—which is newly released by the ACME company may be discussed among individuals and described in press releases and news website, but may not be available to a content provider of an entity unrelated to the ACME company and its retailers or distributors (e.g., as an electronic marketplace or auction website). In the alternative, the new product represents content that may exist in the content provider as a new entry but may not be provided to users because it was never purchased or recognized by a user interaction from prior queries.

In an aspect, when queries spike in the electronic marketplace or auction website, common textual features in the queries are used as a basis to crawl and analyze news or social media content to determine if any of the news or social media content include the common textual features. Such news or social media content, when found, are likely to describe new content that is subject in the queries. The news or social media content reflect webpages that include the common textual features that may be crawled for identifiers, such as hyperlinks. The identifiers within the individual one of the news or social media content may provide access to additional content that are specifications and/or product release information (e.g., hyperlinks to a manufacturer's or retailer's product release webpages). The specifications and/or product release information provide content details for the new content that is intended as responsive to the queries. The computer system may be configured to index one or more of the identifiers and the related content or a portion of the information contained therein. Then, in response to a content query that is determined as to the newly released content, subsequent or concurrent with the spike, the website receiving the content query is able to be responsive and generate display content with the new content (e.g., the identifier, the related content, or the portion of the information contained therein). For example, instead of a static results webpage, the display content is dynamic and includes areas existing content (from prior user searches), but also with an additional area for dynamic modification to comprise the new content. Alternatively, a ranking of matching content indexed from prior user searches in the website may be provided. A modification of the ranking occurs so that the new content is placed in an intervening position in the ranking for the display content.

Various other functions can be implemented within the various embodiments as well as discussed and suggested elsewhere herein.

FIG. 1 illustrates an example of display content 102 that can be presented in an application 100 on a screen of a computer in accordance with various embodiments. In an example, the display content 102 is a window, a website, or application screen of a web browser or a stand-alone application for interacting with the display content and for executing dynamic scripts within the display content. A user may search or interact with the display content via a search field 108. The content may be products, items, services, or electronic media. A query 118 is provided in the search field 108 in one implementation of the searching or the interaction with display content. When the submit option is selected, the search may be initiated and processed on the computer or on a server as discussed subsequently in this disclosure. In example 100 of FIG. 1A, a query 118 for "ACME MODEL ONE" is entered into the search field 108, and the display content is provided with a results section 104—e.g., a webpage or display content 102. As illustrated, there are three search results 110-114 in the display content, with an indication (e.g., down arrow with text "MORE" at the bottom of the page 102 or the grey scroll indicator on the right of the page 102) for more search results if the display content was scrolled down. The display content may each include summary specifications as shown in example 114 by reference numeral 116. Categories within the display content are presented on one side 106B of the search results, while sponsored content may be displayed in other available area 106A.

The search results 110-114 are illustrated as search results that may be based on prior behavioral clues from users' prior searches. For example, existing items and existing item names that were previously searched by users and that share terms with the query may be provided for the search results 110-114 in an allocated area or slot. Indeed, the provided title of the content of each search result 110-114 may reflect a product underlying the result. For example, BRAND ONE MODEL may be a brand name (i.e., BRAND ONE) and/or a product name (i.e., ONE). In the alternative, the title provided may be an effort to target specific product searches, long after the searches have been made and the search queries analyzed. The above search results 110-114, however, may be limited to analysis of user queries within the website 102 and may not reflect a newly released product with the name ACME MODEL ONE. As a result, the search results 110-114 may be limited to items previously searched by other users. Here, even though the user may be more informed about new releases and may be seeking information on the website 102 for the new release, the website 102 may be relying on past user behavior and may not generate information as to the newly released item in response to the query provided because the newly release product has never been provided in a search results or in a proper recognizable area of the search results. This may also be the case when the newly release item is newly entered into a catalog of the website 102, but was never previously produced in a search result or purchased via website 102. Search results 110-114 are the closest matches the query, from different categories, based on past searches using similar keywords in the query.

In a further aspect, the search results 110-114 are partly generated by a ranking that may be based on prior behavioral clues from users' prior searches. For example, existing items and existing item names that were previously searched by users and that share terms with the query may be retrieved from a data store. The existing items and existing item names may be ranked according to popularity of interactions—e.g., purchases, clicks, hovering cursors, etc. In another aspect, click-through-rates or user time spent on item pages within the website providing the search results may be used to rank the search results 110-114. One of ordinary skill would recognize that the website and its hosting servers may not provide new items—either newly available from other websites or newly cataloged in the website as part of the search results—reflecting an issue of cold start for the new items. Alternatively, it may be the case that the new items do not appear with sufficient visibility in the rankings of search results 110-114 to be displayed on the first page the search results or in subsequent pages of search results till the end of the search results. These issues may be a consequence of an inability of the host servers to index data in a manner to include new items. These issues may also be a consequence of the host server's inability to efficiently process data and results in latency issues and increased traffic, which culminate in decreased user experience. The solutions in this disclosure includes systems, and software or firmware configurations, that are available to modify rankings of the search results 110-114 to incorporate new items from third-party website or cataloged results without attributed interactions. As a result, a website incorporating the present solutions as configurations in the host server, for example, may provide reduced latency and misdirected traffic by providing accurate search results based at least in part on new item releases or cataloged in the website.

Figure 2:
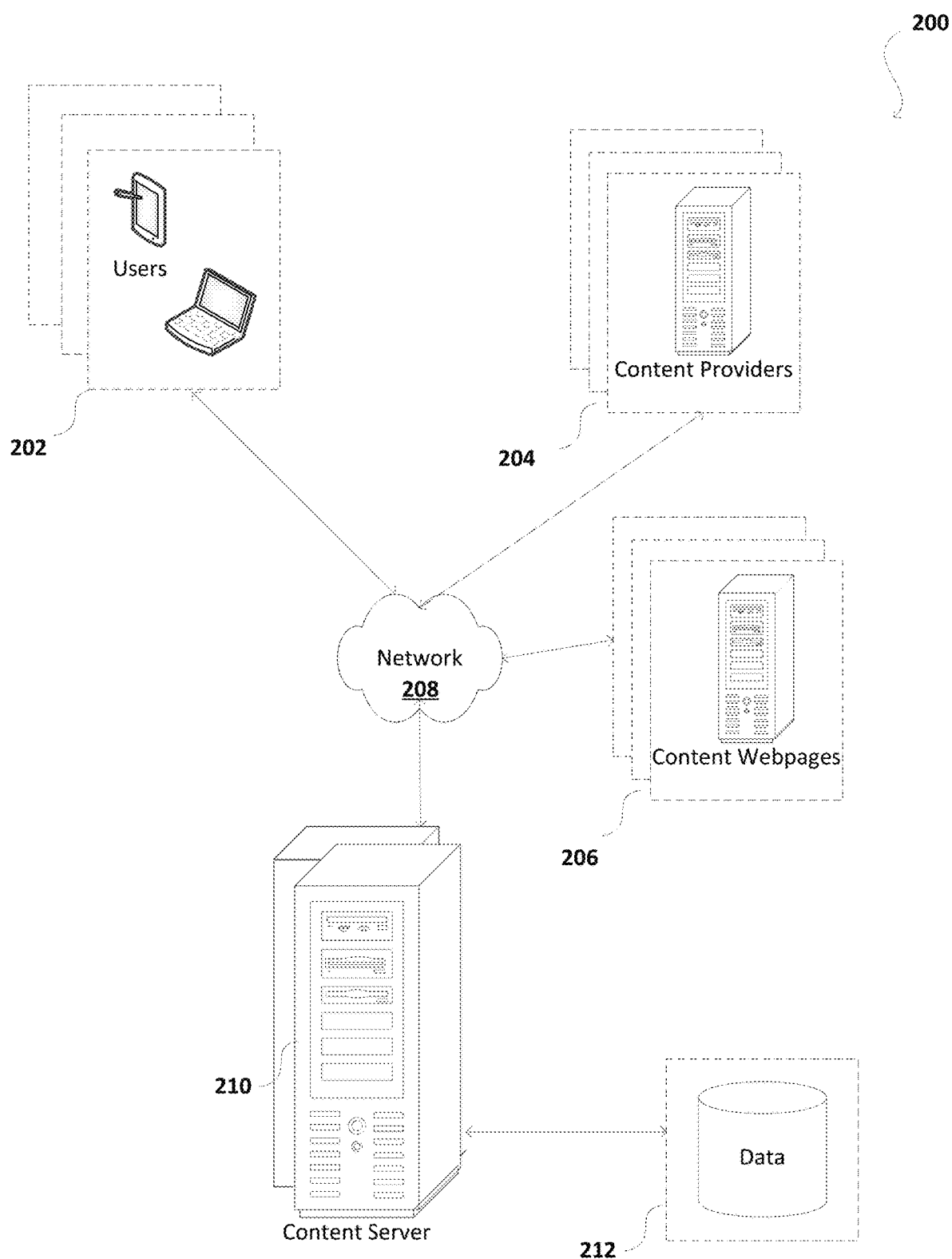
FIG. 2 illustrates an example system architecture for performing the disclosed embodiments in accordance with an aspect of this disclosure.

FIG. 2 illustrates an example system architecture 200 for performing the disclosed embodiments in accordance with an aspect of this disclosure. The example environment 200 may include computing components and network relationships that are applicable for providing the content in the webpage or display content 102 of FIG. 1. The example environment 200 includes a content server 210 for serving content in response to a search or interaction on the webpage or display content 102; a database 212 for storing content from content providers 204 (e.g., product information, service information, advertisement, and other related information; news, social media, and other product/service related content from which information is gleaned for use in the present system. Further, advertisement networks may provide paid content (e.g., content in section 106 of content page 102), and users with computing devices 202 may send queries or interact with the content server to access the paid content (e.g., advertisement) or unpaid content (e.g., digital information for products and services that may be referred to or available for purchase via the content server 210).

Content providers 204 are able to utilize respective computing systems and/or devices to interact with the content server 210 through the network 208, for example, a local area network (LAN) or wide area network (WAN), e.g., the Internet. Similarly, users with computing devices 202 are able to utilize their respective computing device to access content (e.g., websites or stand-alone web enabled applications 102) that may be offered through the content server 210 or via the content providers 204 over the network 208. For example, content providers 204 can provide content (e.g., webpages, product information, etc.) that is accessible over the network 208 (e.g., the Internet). In such an example, the content providers use the content server as a host for interacting with the users/client devices 202. In an alternate implementation, the content server hosts its own services for providing content of the content providers 204, such as an electronic marketplace. In yet another alternative implementation, the content providers 204 may utilize one or more of its own computing systems to provide a website or web-enabled application that is accessible through the network 208. In such an implementation, the content server 210 may provide referral links for content to the content providers' websites for purchase of associated products and/or services.

The content providers' website or web-enabled applications may offer opportunities to present additional, and in some instances, paid content to users accessing the website. For example, electronic advertisements or other digital media may be provided for newly released products based on the analysis of queries and news websites described herein. The computing devices and/or systems for each of the content server 210, content providers 204, content webpages 206 (e.g., news and social media), and users with computing devices 202 will each generally include memory for storing instructions and data, and at least one processor for executing the stored instructions that configure the computing devices and/or systems to perform the features disclosed.

When a user with a computing device 202 uses the computing device to access content from the content server 210 or content providers 204, the relevant content provider 204 can send, either directly or via the content server 210, responsive content to the computing device 202. This access for content can include various requests or searches to find specific content hosted by the content server 210 or content providers 204. Further, content server 210 may be a special status host and may have special access ability to index content from various content providers 204 that are hosted or released to content webpages 206. This process allows at least a portion of new content to be indexed to provide sufficient new information to interested parties in future searches via content server 210. Accordingly, content server 210 may include cookies, authentication certificates, or signed certificates to enable such access to protected content hosted in content webpages 206.

Figure 3:
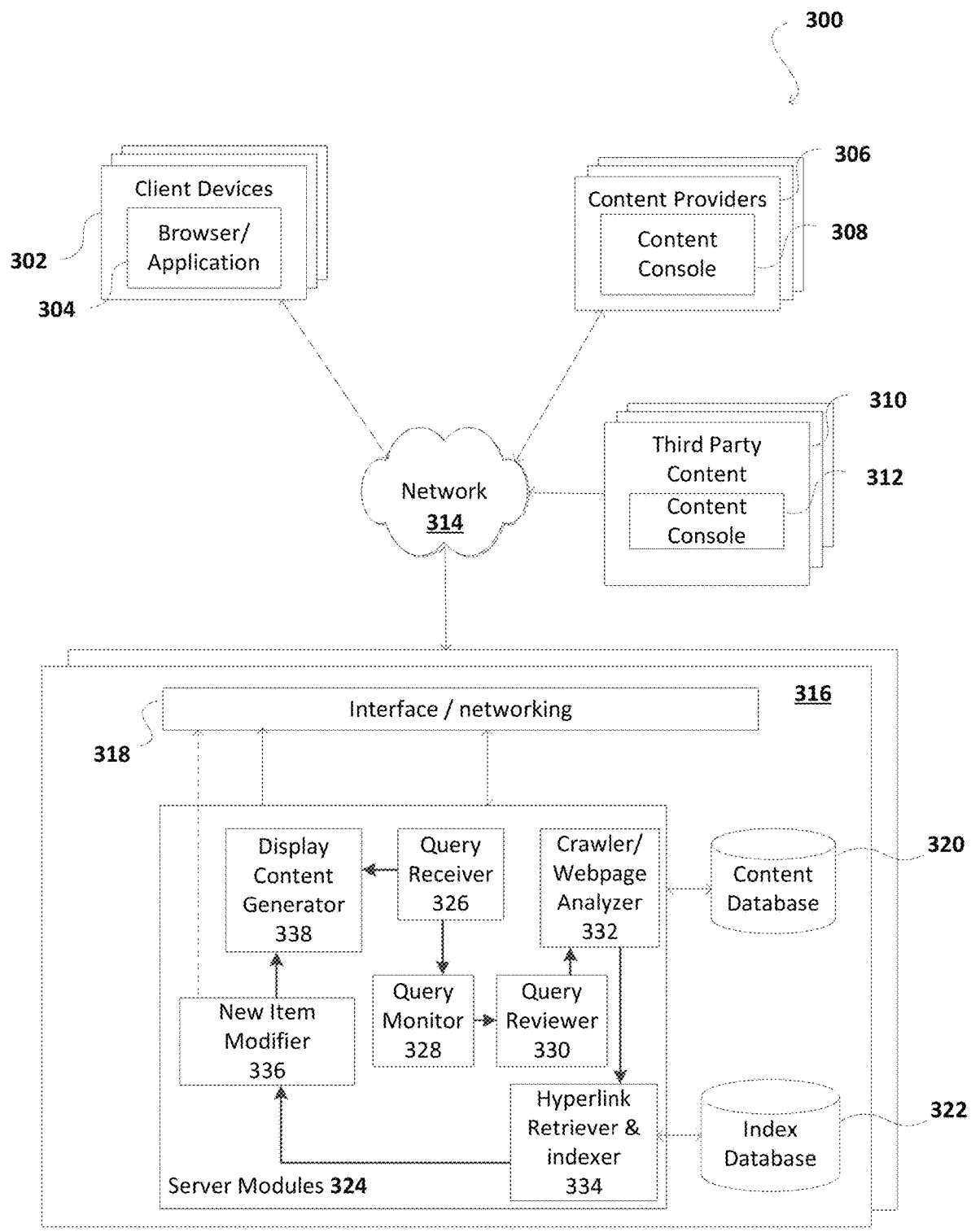
FIG. 3 illustrates example system architecture for performing the disclosed embodiments in accordance with another aspect of this disclosure.

FIG. 3 illustrates an example system architecture 300 for performing the disclosed embodiments in accordance with a further aspect of this disclosure. The system architecture 300 includes content providers 306 in communication with content servers 316 and with client devices 302, via network 314. As noted with respect to FIG. 2, the content providers 306 may incorporate features of the content servers 316 as discussed subsequently herein to process content in a similar manner as the content servers 316. Client devices 302 and content provider devices 306 can include any processor and memory based electronic devices with capabilities as disclosed herein, but at least with the capability to execute computer-readable instructions in a browser or to execute computer-readable instructions with or without a browser. These electronic devices are described in detail below and include specific configuration to perform the functions herein. Such electronic devices may include personal computers, tablets, ultrabooks, smartphones, cell phones, wearable watches and related devices, handheld messaging devices, laptop computers, set-top boxes, personal data assistants, electronic book readers and the like. Each of these electronics devices may be configured to include a browser or a stand-alone application 304/308 that is capable of being configured in the manner of this disclosure. In an implementation, content providers 306 may use one or more of content servers 316 to run tests on hardware and software features or services offered in the system architecture 300. Users or consumers of electronic or online products and/or services use the client devices 302 to interface with a website providing such content.

Network 314 can include any appropriate network, including an intranet, the internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such system architecture 300 can depend at least in part upon the type of network and/or environment selected. Protocols and components for communicating via such a network are well known and will not be discussed herein in detail. Communication over the network 314 can be enabled via wired or wireless connections and combinations thereof. In this example, content server 316 may include one or more local servers in communication with each other and with other remote servers via the network 314. In an example, the content server 316 includes a web server for receiving requests and serving content from the client devices 302 and/or the content providers 306. In response thereto, although for other networks, an alternative device serving a similar purpose as any one of the content server 316 could be used, as would be apparent to one of ordinary skill in the art upon reading this disclosure.

In a further example, the content providers 306 may include a content console 308 for communicating with the content server 316. The content console may be an internet-enabled application (e.g., browser/stand-alone application) that is configured to execute on the content provider 306 and is configured to communicate with the content server 316 in the manner described herein. The communications between the content server 316 and the servers/devices of FIG. 3 are via an interface or networking component 318, such as a network interface card or a wireless interface. In alternate embodiments, the system architecture 300 is maintained internal and confidential between the content providers 306 and the content server 316 during the configuration stages. Accordingly, one or more components or modules in the system architecture 300 are isolated from external influence by any known security methods, including firewalls, during configuration stages. Alternatively, sections of the one or more components or modules in the system architecture 300 are available within one or more content providers 306. In yet another alternative implementation, sections of the one or more components or modules in the system architecture 300 may be secure, while other sections of the one or more components or modules may be available in the public domain to interface with client devices 302. In accordance with such alternate implementations, one or more components or modules in system architecture 300 may also be virtual machines or operate in a virtual environment for performing one or more of the features disclosed herein.

Further, in the example architecture 300 of FIG. 3, real-time or dynamic search results are provided for queries from the client devices 302. For example, queries are addressed in real-time or dynamically via the server modules 324, which may include machine learning capabilities, a display content generator 338, and a new item modifier 336. Modules 324 and 336 may cooperatively function under two or more modes. In one of the modes, the machine learning features of select modules 324 (e.g., crawler/webpage analyzer 332 and query reviewer 330) may constantly improve upon itself using each new query and newly modified content as feedback to their respective machine learning algorithms to ensure a robust functionality. Machine learning aspects are provided in the examples of FIGS. 6A-B, and 7. Such a mode may be referred to as a training mode. In an application of neural networks for the machine learning operations, the machine learning aspects of these modules may train one or more neural networks with each new query and newly modified content while running active operations with a copy of an active previously-trained neural network. Once the new query and newly modified content has been trained to one or more inactive neural networks, the one or more inactive neural networks may be activated and the previously-trained neural networks may be inactivated for training. Alternatively, bulk queries and modified content is also available to train one or more neural networks during an assigned downtime.

In content server 316, the queries from client devices 302 may be received via module 326. Results webpage(s) or display content is generated by module 338. In an example, the display content generator 338 is a module that includes HTML® and various dynamic scripts that are formatted for rendering on the client device 302. The dynamic scripts enable additional requests for information to populate an HTML® formatted page upon rendering on the client device, for instance. In addition, content server 316 includes a query monitor 328 for determining if there is a spike in the received queries. In an example, such a spike may be a general increase in search traffic or an increase in specific search queries. Query reviewer 330 is a module that may be separate or part of the query monitor 328, and that reviews the queries themselves to determine if any of the queries (e.g., from a detected spike) have common textual features.

In an example, the common textual features are determined by a machine learning algorithm of the module which determines similarity and/or semantic relationships between the query terms. Semantic relationship may pertain to implementations where one or more queries during the spike include a typographical error or a word sounding similar to an actual new item name. The reliance on semantic relationships in the machine learning process may still indicate such a query as indicative of a possible new item release. An example implementation is provided in FIGS. 6A-B and it supporting discussion. For example, two or more words in a query form a basis for identifying similarity and/or semantic relationships with similar groupings in other queries during the spike. With two or more words take in different combinations from a query for comparison with other queries, a reliance on a single word pair may be eliminated for further robustness in the similarity matching process.

Furthermore, noun identifiers are weighed preferably over articles and other grammar portions from the queries. The two or more words are analyzed against individual words or similar groupings across multiple queries since the spike occurred. In a process to eliminate false positives, the two or more words identified as similar and/or semantically similar may be compared against prior queries or content stored in the content database 320 to ensure that the queries do not relate to existing items or products forming part of the content in content database 320. Indeed, if no content is seen as matching, then it is likely that the queries relate to a new item. Each word in a query may be taken with another word of the query to find correlation to the word pair. In an alternate aspect, from one query detected during the spike, two words are taken as a single word and then combined with one or more words to find correlation between the grouping and other groupings from other queries during the spike. The semantic relationships and/or similarities are comprised of measures that are then applicable to provide measurable representations for semantic relationships and/or the similarity.

In an implementation, terms identified as semantically similar and/or plainly similar across queries are then used to search the third party content webpages 310 (e.g., news webpages or social media) for content indicative of new item releases (i.e., product or service electronic releases or publications). For example, instead of merely crawling for new webpages, crawler and webpage analyzer 332 may be used to analyze newly published webpages to determine if the common textual features within the queries, during the spike, are also found in one or more of the newly published webpages. When the common textual features are found, then the one or more of the newly published webpages are further analyzed for embedded hyperlinks. Identifiers may be hyperlinks, Uniform Resource Identifiers (URIs), or Uniform Resource Locators (URLs). As newly retrieved webpages are news and social media webpages, it is likely to be the case that these webpages include a link to the product description or domain of the manufacturer, retailer, or distributor of the newly released item. The hyperlinks determined as embedded in the news and social media webpages 310 are extracted and provided as part of modified content display that include publicity for new items, thereby resolving, in part, an issue of electronic content discovery related to cold start for new products and services.

The identifiers determined as embedded in the news and social media content 310 are retrieved and indexed in the index database 322 by the hyperlink retriever and indexer module 334. The hyperlink retriever and indexer module 334 may retrieve and generate a ranking of search results for the display content. The ranking of the search results may be by previous interactions received from prior searches within the website. The new item modifier 336 may then retrieve the indexed hyperlink and at least a portion of the content (including information from webpages referenced by the hyperlink, such as text, image, video, or audio portions) and provide this to modify the display content from the display content generator 338. Further, the new item modifier 336 may, alternatively or concurrently, modify the ranking of the search results to provide the indexed hyperlink and at least the portion of the content in an intervening position in the ranking for the display content. In addition, the new item modifier 336 may be part of the hyperlink retriever and indexer module 334, and may perform the modification of the ranking of the search results along with (e.g., concurrently with) the generation of the search results for the display content.

For example, when the ranking is based at least in part on prior searches within the website, the search results for the display content are provided with rankings—e.g., 1, 2, 3 . . . etc.—representing a maximum number of results for one page of the display content. The maximum number of results is configurable by the user to display more ranked results per page of the display content. When the modification is performed, content for the new item, including an identifier and a portion of an underlying specification or other information, may be provided in the intervening position of the above example rankings. In one aspect, content for the new item is provided in the "1" ranking, while the existing item previously ranked at the "1" ranking is moved down to 2 or subsequent ranks. Such a modification may occur dynamically, as new items are released and/or as required for the search results. Alternatively, the display content includes an area for the new content under a special ranking—e.g, a ranking representation of "0" implying a default status at the top of one or more pages in the display content. As such, the intervening ranking may correspond to modification of the existing rank or insertion of a ranking or placement that would position the content for the new item with more visibility than the remaining search results.

In another aspect, the display content is modified after being provided to the client device 302. When the display content includes dynamic script that requests for updates to the search results—to maintain updated search results—the new item modifier may provide the portion of the content corresponding to the new item and the identifier retrieved by the module 334 to modify the display content. Alternatively, modifier of module 336 modifies the results webpage as it renders on the client device 302. In such an alternative implementation, a slot or allocated area is designed in the display content for providing updated information or for providing most relevant new item information to the client device 302. The slot or allocated area is a dynamic area to incorporate the new item information and the hyperlink in a dynamic manner, and representing an updated look and feel for the results webpage. Moreover, the use of the display content provides a graphical user interface that is dynamic—offering accurate and up-to-date content that is distinct from static content of a search results page. The use of such dynamic display content ensures that real estate exists to present existing content as well as to modify the display content for accurate and new information. Retrieved content from the index database 322 is subject to the new item modifier 336 for formatting and presentation in the display content from display content generator 338. In an implementation, the new item information and related hyperlink is sent from the modifier with the display content and modifies the display content during rendering at the client device 302.

Figure 4:
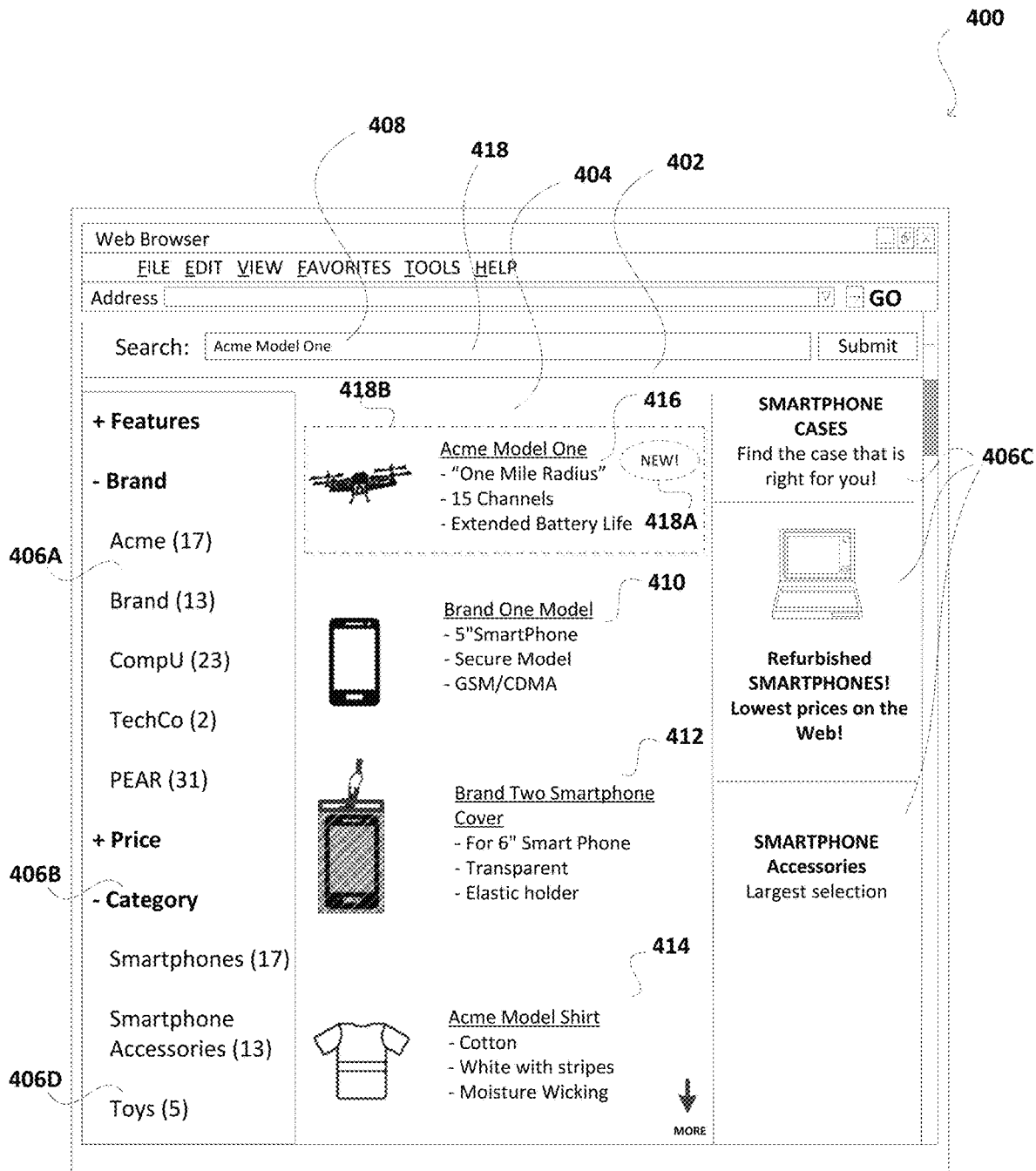
FIG. 4 illustrates an example of a window of modified display content that can be presented in accordance with various embodiments.

FIG. 4 illustrates an example 400 of a window of modified display content 304 that can be presented in accordance with various embodiments. This example, like the example of FIG. 1 utilizes an electronic marketplace as the content at issue. In the example 400, like in example 100 of FIG. 1, the window may be a web browser or a stand-alone application for interacting with display content 402 of the electronic marketplace. A user may search or interact with the display content via a search field 408. A query 418 is provided in the search field 408 in one implementation of the searching or the interaction with display content. When the submit option is selected, the search may be initiated and processed on the computer or on a server as discussed in the implementations of FIGS. 1-3. In example 400 of FIG. 4, a query 418 for ACME MODEL ONE is entered into the search field 408, and the search results are provided in the results section 404 of the display content 402. As illustrated, there are four search results 410-416 on display, with an indication for more results (e.g., down arrow with text "MORE" at the bottom of the page 402 or the grey scroll indicator on the right of the page 302) if the display content was scrolled down. Result 416, while illustrated in the search results may load after the existing results—i.e., results 410-414, are loaded. Categories within the search results are presented on one side 406A-B and 406D of the search results, while sponsored content may be displayed on other available area 406C. Category 406D may be a new category based on a learning of the new item type—DRONE and the commonly used terms associated with DRONE—e.g., TOY. As a result, the display content may be modified to include a new category 406D and the corresponding new item result 416.

The search results 410-416 are illustrated as search results that are modified to be responsive to the user's query that is determined as a new item query. As a result, a new item 416 (ACME MODEL ONE drone) is provided in a slot at the top of the display content. The new item may be indicated by special bordering or markings, e.g., marking 418A stating NEW as to the new search result responsive to the query. In an alternate implementation, a highlight or marker of any sort may be applied to the new item portion of the content to reflect that dynamic modification has occurred. The example marked highlight 418A is illustrated over the slot 418B to reflect this. In addition, a decay function may be associated with the marked highlight 418A or slot 418B. The decay function, in one example, may cause the highlight to draw the customer's attention to it and then fade over the decay time set in the decay function. Such an implementation further improves the user interface displayed in the example electronic marketplace as discussed above. For example, the decay function improves the ability of the computer to display information and interact with the user through the use of content modification that dynamically indicates relevant information to the user's query.

In aspects of this disclosure, other locations for the slot 418B may be provided in the display content 402. Further, the title or the slot may include an embedded hyperlink to the product information page that was retrieved from the news or social media content and indexed in the index database that is illustrated in FIG. 3. In addition, summary specifications the new item may be provided under the item title, as extracted from the product information page of the underlying hyperlink. In another aspect, along with or separate from the marked highlight 418A, the modified portion of the display content 402 might be subject to the decay function as well. For example, the modified portion—the slot 418B—may fade to the original terms in the content and may fade back to the modified portion. Alternatively, a hover-over event may be implemented for a cursor action. Here, a timing function determines the hover-over time of a cursor over the modified portion (e.g., marked highlight boundary of slot 418B). As such, when the cursor hovers over the ACME MODEL ONE for the time specified in the timing function, the modification may revert back to the original term that existed prior to the modification.

In another example aspect, the summary specifications under the title in slot 418B may be displayed as an image from the retrieved content. For example, certain products provide stickers or labels providing critical or relevant information. Such information may be retrieved as part of the search process herein. In an example, the system of the disclosure herein is available to modify any content type than a displayed results webpage. For example, in audio-based or image-based searching, a similar manner as described above is applicable. Semantically similar or same audio or images to the query audio or images are generated based on a search of such content in news or social media content. Linked audio or images in the news or social media content is extracted and indexed along with an identifier for the source of the linked audio or images. Such a process is initiated after based at least in part on determining that a spike in queries has occurred. Video searching is similarly possible using frames within the video as portions of the video may be indexed based on searching of video-type social media content and video news, for instance. In an example, audio-based searching may be based of text-to-audio read-back, where the text results are read-back with a modification announced as the new item is identified as responsive to an audio-based query.

Figure 5:
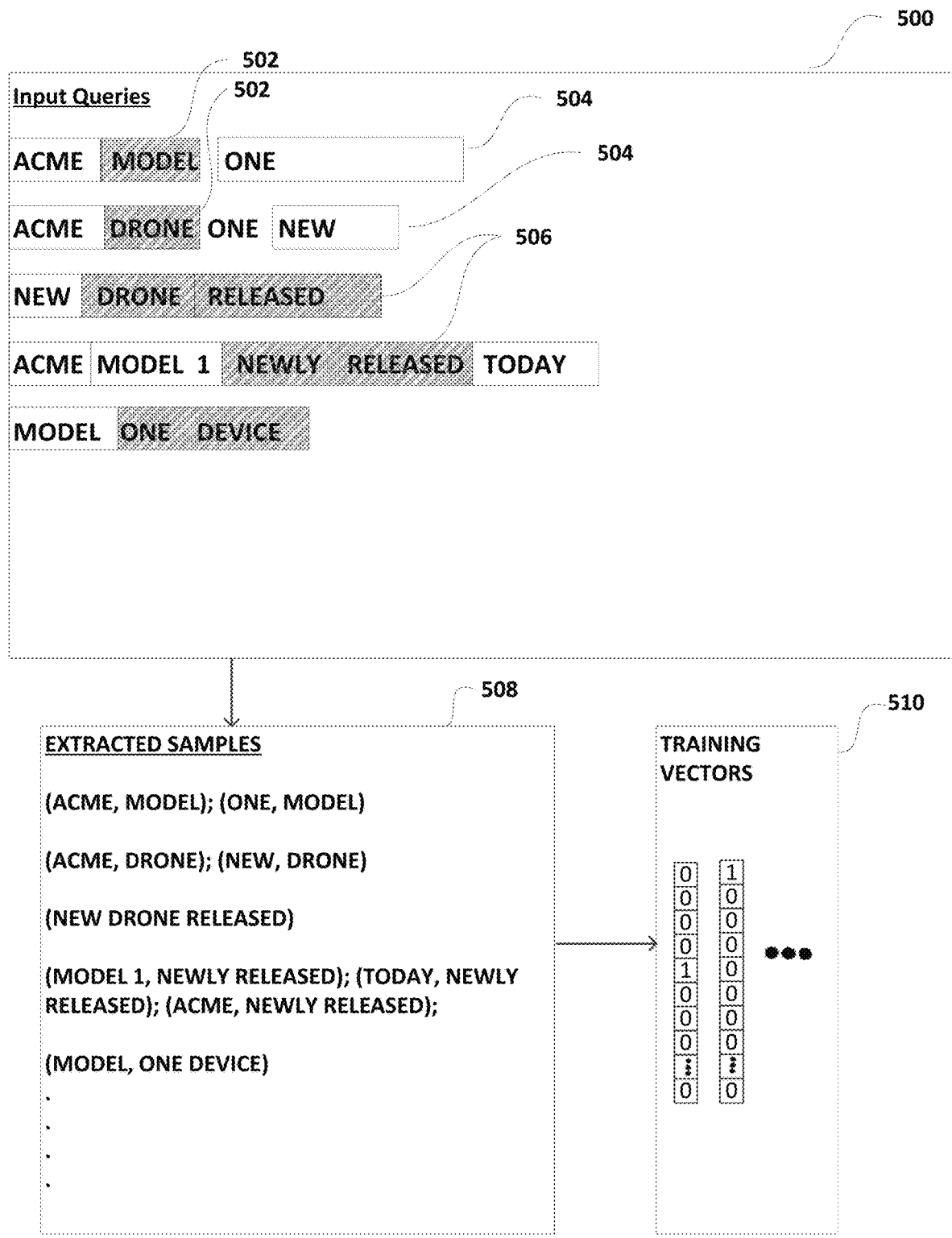
FIG. 5 illustrates an example of semantic processing for machine learning in accordance with various embodiments.

FIG. 5 illustrates an example of semantic processing for machine learning in accordance with various embodiments that may be applied to achieve the above modification of content. The machine learning of FIG. 5 may be implemented in server module 330 to find common textual features in a query among multiple queries identified as part of a spike in received queries. When the common textual features are found as identified by a machine learning algorithm, then the common textual feature forms a basis for crawling and analyzing of news and/or social media webpages. For the machine learning part, as illustrated in section 500 the query from the search is provided as individual words to the machine learning algorithm. In this example, each entry represents a query identified as part of a query spike. In an implementation, an individual word 502 is taken and combined with each other word 504 from a query to create a robust trained network for query recognition. Further, groups of words 506 that are limited by a predefined number of words may be taken from a query and combined with other groups of the same query (e.g., MODEL 1, NEWLY RELEASED) for training a network. Such training may be supervised or unsupervised. From the example in FIG. 5, a machine learning trained dataset would be able to distinguish incoming queries as belong to the spike or outside the spike.

In FIG. 5, a select root term may be chosen (e.g., reference numerals 502/506) around which the training is performed. For example, in the input queries 500, the first two queries include a respective root terms 502. The first two queries also include associated terms 504 used for training with the respective root terms 502. The associated terms 504 may provide context to the root term and helps with the machine learning process. The remaining queries in reference numeral 400 similarly follow the first two queries, but illustrate instances of using phrases 506 and associated groups or individual words for training a dataset to recognize a word or phrase associated with a trained phrase. In the machine learning process, term samples 508 are extracted from the queries 500. For example, the term samples include the root term 502 and each associated term 504—such as (MODEL, ACME); (MODEL, ONE); (DRONE, ACME); and (DRONE, NEW)—for the first two queries in reference numeral 500.

The machine learning process trains a neural network (NN) to recognize that MODEL and ACME or DRONE AND ACME share a contextual relationship such as a semantic relationship (e.g., used together in a search). Similarly, DRONE RELEASED and NEW share a semantic relationship for being used with each other. While the query for DRONE RELEASE is newly received, a trained dataset of the NN may recognize the query as for the new item. There are large numbers of such queries that are utilized in the machine learning process and that provide similar contextual input. A spike in queries, therefore, enables a robust dataset to provide up-to-date new item information for new queries as they are received since the spike. For example, if ACME and MODEL are often used together then a large number of the queries would include these two terms. When these large numbers of queries comprising these terms are used to train a neural network, using the terms interchangeably as root and associated terms, then such a trained neural network would be able to predict one of these terms when provided with the other term as an input. For example, an NN trained to recognize these two terms as semantically related will provide an indication that the new item is a predicted search result when ACME or MODEL or ONE (or any variation of these words) is provided as an input.

Figure 6A:
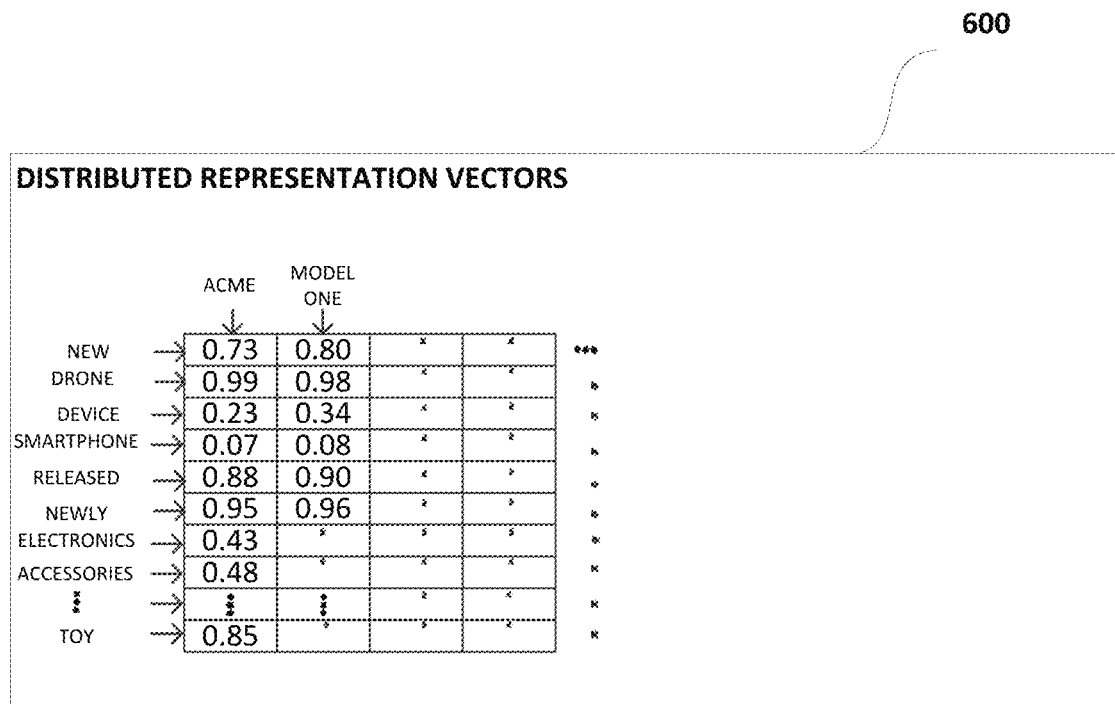
FIGS. 6A and 6B illustrate other examples of semantic processing for machine learning in accordance with various embodiments.

Further, while the extracted samples 508 are illustrated as a root word phrase and associated word or phrases, a window of three or more terms may be used to provide additional context. Then neural networks may be trained to recognize that each root word may be semantically related with two or more associated terms. While providing training vectors 510 for each word, it may be prudent to use a more robust training vector. The training vectors 510 may represent a single word with 0s in all rows, but a 1 in a single row to represent a word—e.g., ACME. This is also referred to as a one-dimensional representation of a word. The training vectors 510 may be used as provided, but an option to use distributed training vectors 600, as illustrated in FIG. 6A, is also available. The distributed training vectors may be a transformation of one-dimensional training vectors to form a multi-dimensional representation of words. As such, this transformation may be seen as a process of determining vector of semantic terms (e.g., a sentence) by averaging individual terms in the individual vectors.

In an implementation, the one-dimensional representation of a word may be prepared for the transformation to a multi-dimensional representation of words based on a matrix multiplication with a feature matrix. The feature matrix may provide the word's relationship to other words forming the multi-dimensional representation. For example, using a single word's one-dimensional training vector, a neural network with a hidden layer and multiple related words may be trained to recognize the single word from multiple related words. In such an implementation, the back propagation of error and the feed-forward process may correct initial random values in the hidden layer to an accurate representation of a multi-dimensional vector for the word's relation to other words. In FIG. 6A, the words in the query of FIGS. 1 and 4 are provided in comparison with other words generally available in a database of terms through a multi-dimension vector.

In another example aspect, word to word comparison may be performed, and may be extended to multiple words in a window. A training vector for a word, as illustrated in reference number 510, may be first converted into a feature representation using a feature matrix. A feature matrix is composed of various values associated with unique features in text. For example, words with known relationships to other words may be a feature predefined in the feature matrix. The distributed representation vectors 600 may represent one such implementation. The training vector for a word may be multiplied with the feature vector to provide the feature representation. As the training vector for each word is a single row of multiple 0s and a single 1 entry, the resulting feature representation will be a single row of multiple columns of values. To find a relationship between words, two respective feature representations—one for each word—is multiple and fed to a classifier. In an example the classifier may be a softmax classifier which is a normalized function that marginalizes the largest value from the lower values in a provided input. As a result, highly related words are classified in a manner to distinguish a lesser relationship word-pair.

For example, the multiplied values from the feature representations of word A with a word B may provide a singular value. A similar evaluation of word A may be performed with multiple words. Following this the classifier may be applied to the collection of singular values to provide a vector distribution of the words associated with word A in different levels of closeness. The closeness demonstrates a sematic relationship from prior use of the words associated with word A. The vector distribution may represent a trained network which will be able to predict a word to output when the input word is Word A, following from the above example. Considering the above application in a multi-dimensional plane, with multiple words and relationships, a trained neural network will be able to identify relationships based on the numerical values associated with words. As such, an input of two or three words allows the trained neural network to predict a word that is bears a relationship to both words. Such a trained neural network may also be designed to provide a level of closeness (semantic relationship or similarity) between words in a query.

Figure 6B:
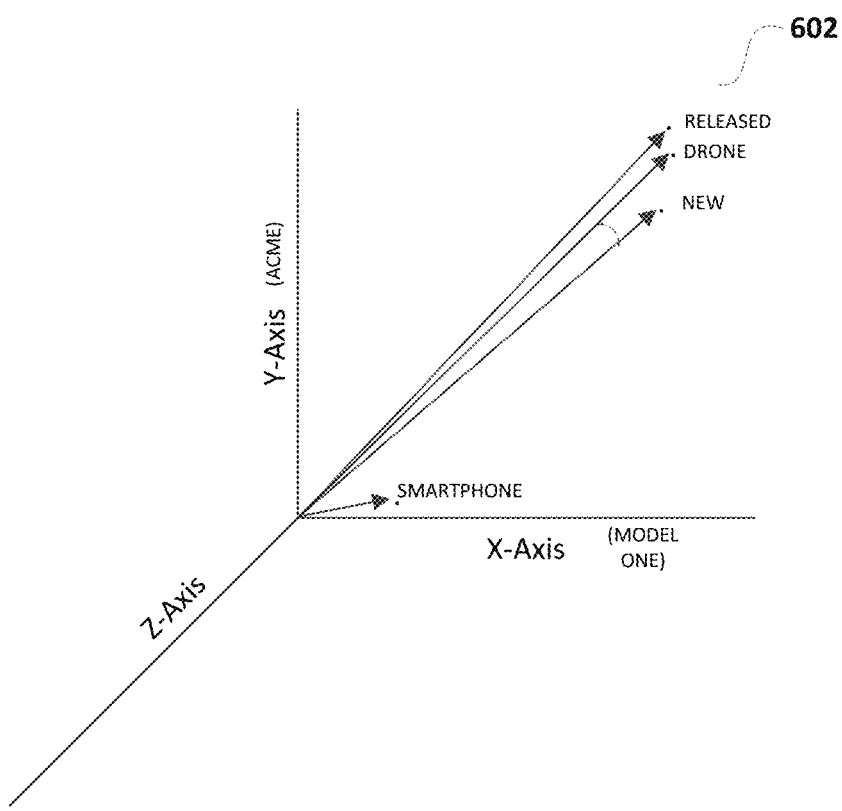

FIG. 6B illustrates another intermediate processing feature for modifying content based in part on a query. When a trained neural network indicates that semantic relationships exists between terms in the query and terms in a database of terms, then the trained neural network may be configured to provide such information. In FIG. 6B, the information as to semantic relationships is provided in the form of a graph 602. The query words ACME and MODEL ONE are determined as related with respect to certain other commonly used words—e.g., DRONE, NEW, RELEASED, and TOY, as demonstrated in the feature matrix 600 of FIG. 6A. While the graph is provided to visualize distances between words as defined in their determined semantic relationships, it is understood that a configured system may not graph the relationships, but merely provide the outputs. As a result, the closest determined terms, by semantic relationships, may have the least distance as calculated by a cosine distance measure or a Euclidean distance measure—once normalized.

In an application of the above trained neural network, once a correlation of queries to find common textual features is completed, a further analysis is performed to determine semantic relationships between words in the retrieved content and the query terms. Finally, the example process herein utilizes one or more of the correlated words or phrases from the queries to represent common textual features and to find if these common textual features exist in news and social media webpages. For example, the words ACME and RELEASED, having found to be semantically similar to other query terms, such as DRONE and TOY, it is most likely the case that a search of news or social media webpages would find a new item described and including these words. As a result, news and/or social media webpages that have these words are likely to include hyperlinks to a product description of the new item underlying the discussion in the news or social media webpages.

In an implementation, the above machine learning is performed in a continuous manner, but at least after a spike in search queries is indicated. Such an implementation represents pre-commutation to improve search results and to make the computing process more efficient. The pre-computation may occur in anticipation of further searches to a new item based on the spike in interest for the underlying common textual features of the query—e.g., for products suddenly in demand (new products, information from new press releases, items on sale, accessories related to new products, etc.). In an example, the pre-computation process monitors for the sudden surge in a specific search terms and stores semantically similar terms to the search terms, but also indexes search results for subsequent searches to a first time search. This improves latency of the search process from users' perspective, but also enables efficient computing as it reduces the burden on the content server (including its related computing devices and modules) to calculate similarity on-the-fly. The combination of pre-computed modification at near real-time with dynamic modification may also be implemented depending on the work-load at the content server. At high traffic times, the work-load may be higher and the demand for resources may need to be balanced with respect to the in-demand content. In such instances, pre-computing may be triggered to benefit the dynamic modification for the search results.

As a result, the use of the present content searching process additionally provides a solution to a network and computer related issue of latency and traffic management for high traffic networks. A user able to secure their specific match may not browse through multiple pages of search results or select to open multiple pages of product information from the search results. This reduces traffic to the content server (and related computing devices). This also reduces the work-load to these devices or allows the devices to be used to perform other tasks—e.g., improving the dataset—than providing pages of search results. In addition, this also removes from any requirement to store search results for anticipated access when the system provides the query-specific search results in the very first page. This alleviates storage issues as the content server processes query and retrieves data for numerous queries every second.

Another technical benefit realized in the use of the present disclosure is the ability to efficiently use display space in the user interface of the electronic marketplace or content display. The specific search results—those with modified content—may be provided the first area of the display content as illustrated in FIG. 4, with other search results in the remaining area previously allocated for the purpose. The user interface of the display content may also be dynamically modified in certain areas executing the appropriate dynamic script to indicate the specific search results separately from the general search results that are based on prior searches. Such areas can include, in addition, sponsored search results (e.g., paid content), including advertisements as to accessories for the new product. In an example, when a user is determined as from a mobile device or using a connection deemed as limiting (e.g., cost prohibitive or high loss/latency connections), it may be most efficient to provide the specific new content results alone. This may require dynamic modification of the display content to display the specific new content, which represents an exact match for a user's query in accordance with the latest developments of the day or the week—e.g., a new product launched is immediately provided when the product is searched instead of the typical search results of a previously highest selling product based on previous user behavior.

Figure 7A:
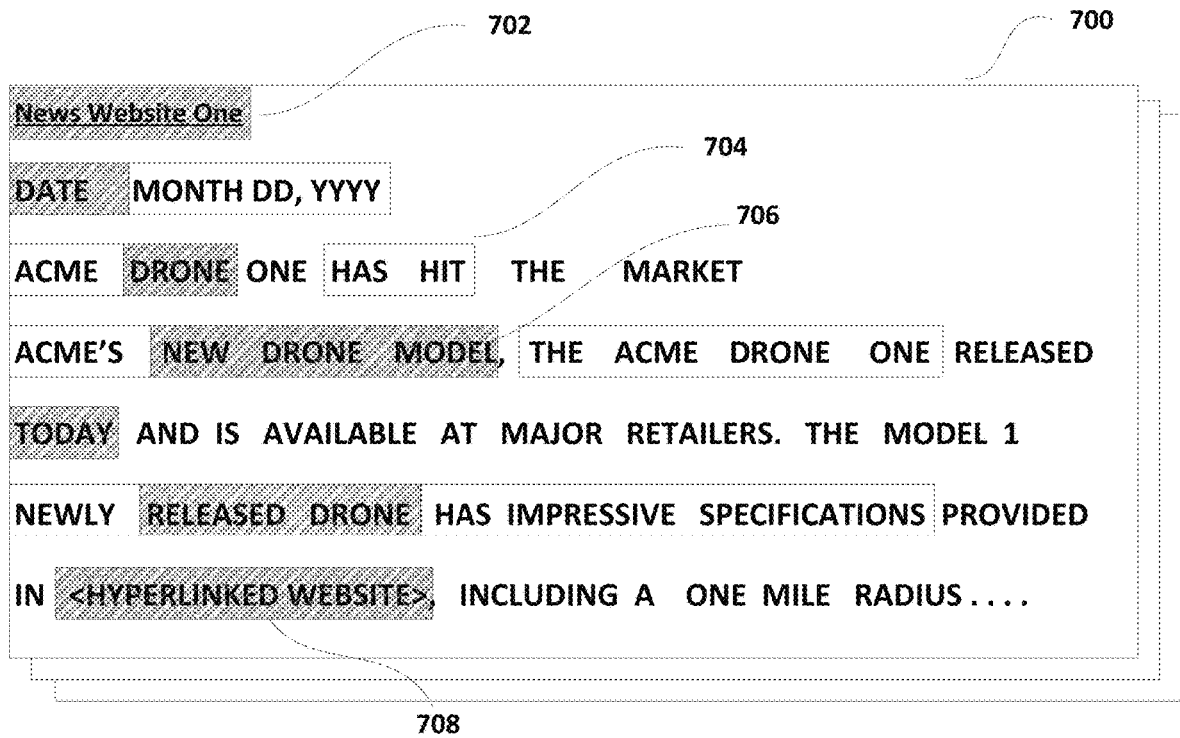
FIG. 7A illustrates examples of semantic processing for machine learning to determine that common textual features from the queries are found in news content in accordance with various embodiments that may be applied to achieve the verification of new content from query spikes.

FIG. 7A illustrates examples of semantic processing for machine learning to determine that common textual features from the queries are found in news websites or webpages 700 in accordance with various embodiments that may be applied to achieve the verification of existence of new items from an monitored query spike. The machine learning of FIG. 7A may be implemented in server module 332 to find that common textual features from queries, during the spike, are found in news websites or webpages 700. Further, a person reading the present disclosure will recognize that the social media webpages are also available in the verification of FIG. 7A. The process in FIG. 7A is similar to the word grouping, sample extraction, and training vector generation from FIG. 5 for common textual features in the queries. The common textual features from the queries are found in news webpages 700 (e.g., reference numeral 706 for NEW DRONE MODEL being similar to words with high commonality from queries 500). When found, the specific webpage 702 may be indexed first. Then the content of the webpage 702 is further crawled to find embedded hyperlinks—e.g., hyperlink 708. The hyperlink is accessed and the underlying webpage from the hyperlink is also accessed and indexed.

Figure 7B:
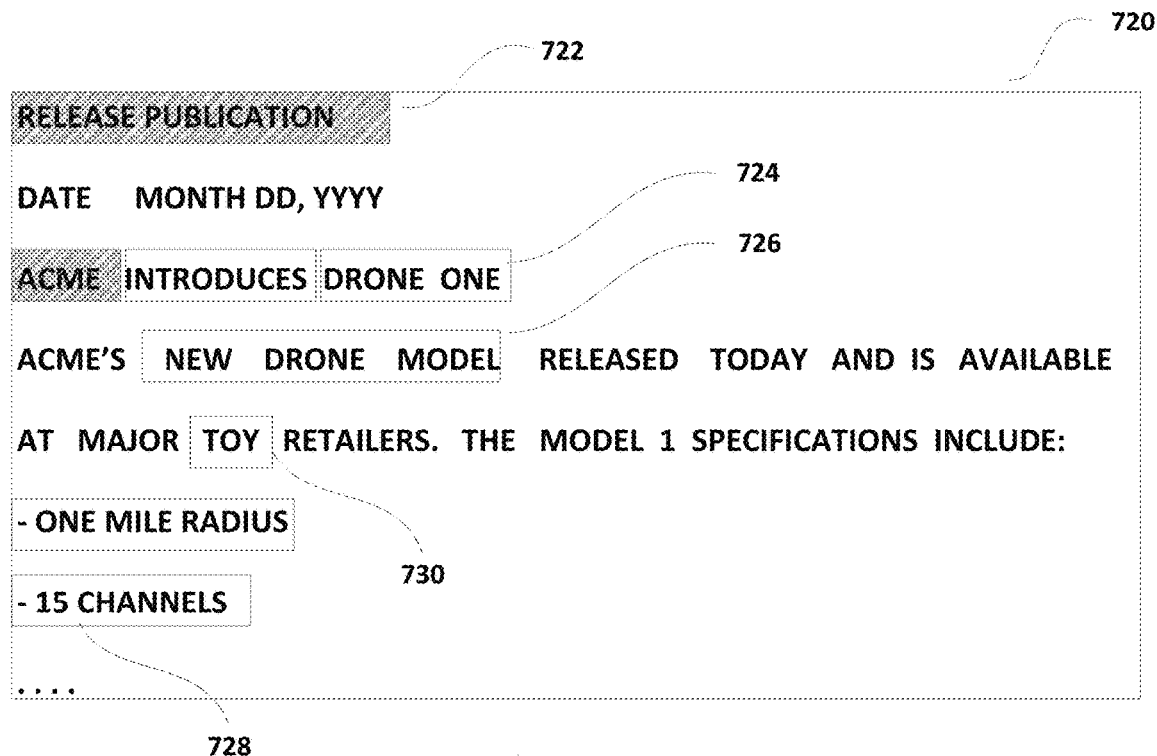
FIG. 7B illustrates examples of cross-verification that textual features in the news content from FIG. 7A are authentic using release publication content in content from a hyperlinked website in the news content in accordance with various embodiments.

Verification may be performed to determine if the hyperlink is related to the article in a substantial manner. For example, FIG. 7B illustrates examples of cross-verification that textual features in the news content from FIG. 7A are authentic using release publication content in content from a hyperlinked website 708 in the news content in accordance with various embodiments. FIG. 7B demonstrates that, when the webpage 720 of the hyperlink 708 is a release publication 722 from the manufacturer, distributor, or retailer of the new item, then many words or phrases in the hyperlinked webpage (e.g., words or phrases 724, 726) would be common (same or semantically similar) to the words or phrases in the news or social media website 702 (e.g., words or phrases 704, 706—HAS HIT and INTRODUCED may be semantically similar for a trained NN dataset). In addition, words or phrases 728, e.g., describing specifics of the new item, from the hyperlinked webpage 720, may be extracted for use in the results webpage with the new item insertion.

An additional verification may be performed based on category specific information for the queries and the new item. For example, a determination is made for whether the textual features are associated with an item category for the item based on a classification of the textual features in a classified dataset providing categories and related terms. For example, as demonstrated in FIGS. 5 and 7A-7B, words commonly used with the textual features may define a category that suits the new item. For example, the item type of DRONE or related use of the word TOY—as per a trained dataset illustrated in FIG. 6A, would result in categorization of the new item as a DRONE or, in a more common category, a TOY. This is illustrated in FIG. 4. The categorization process may include determining category-specific news webpages that are in the item category and accessing the category-specific news webpages to identify the news webpages. In an implementation, if the news webpages is for new toys or new smartphones, then this specific category for the news website may be applied to the new item as well. The categorization also helps differentiate new items by their categories to avoid improper content discovery. For example, marketing of a new movie may include a new video game. However, the new item for discovery may be the new movie. As a result, category-based searching for the first content—news websites and social media—may provide indication that the new item under the spike is a movie than a video game. In an implementation, the number of first content providing information may determine the appropriate classification or categorization. When a number of news webpages describing movies associated with the new item release is higher than a number of news webpages describing video games or other marketing items, the new item is a movie and appropriate movie related results may be provided in a subsequent search involving the movie name as a query.

In yet another verification process, the content server may be configured to parse the hyperlink to determine a domain and a landing page in the domain—such as, of a manufacturer's website. Then a determination is made that the domain belongs to an entity associated with the item based at least in part on a comparison of the domain with a database of entities' domains. For example, if a release publication cites to the manufacturer as ACME and the domain is ACME.com or a variation of the word ACME—e.g., ACMEPRODUCTS.com—then a credibility score may be associated with the entity based at least in part on timing of a release publication within the domain. For example, the creditability score may be based in part on the timing being within a predetermined range of a timing of publication of at least one of the news webpages, which indicates that the hyperlinked website is authentic as the news website is timed based on a publication released from the hyperlinked website for the news website. When the credibility score exceeds a threshold value, then the hyperlink is used an identifier for the item webpage. For example, the timing of the release publication may be determined from a printed time on the release publication or from a time of indexing provided by a web crawler that indexes for new webpages. The printed time or the time of indexing is then provided to adjust the predetermined range.

In another part of the verification process, either concurrent with the above or differently from the above verification, the news webpages is parsed to select sets of contiguous words. This is illustrated in FIG. 7A. A search is performed in the release publication for individual ones of the sets of contiguous words. When a match is found, a count is incremented to indicate matching individual ones of the sets of contiguous words. The credibility score may then be weighed favorably to the domain when the count is more than a predefined number. In another feature, a determination is made as to whether an existing item in the website exists for the queries. When no purchase occurred for the existing item in each instance of a search using the queries received during the spike, then a determination is made that the queries are to a new item.

Figure 8A:
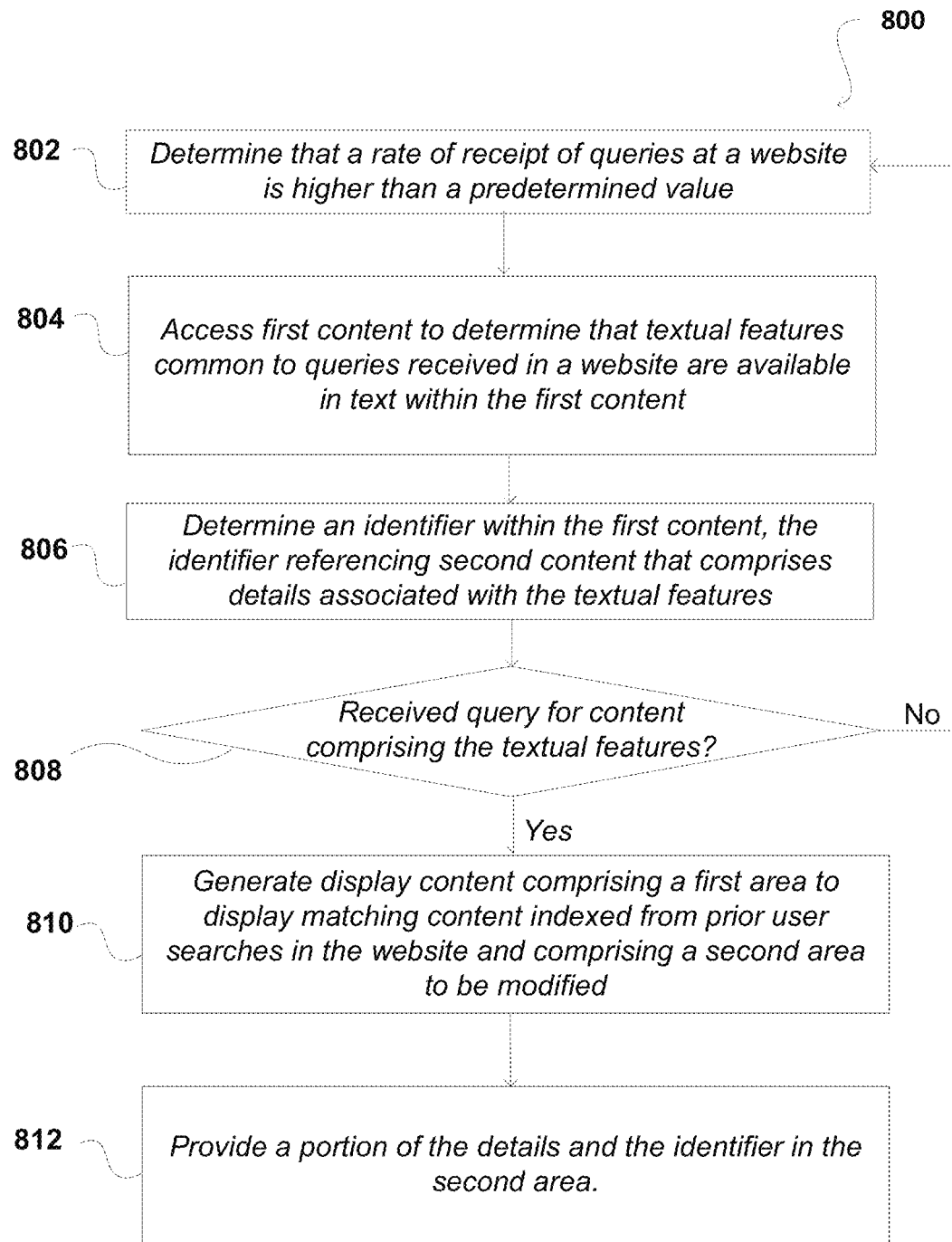
FIGS. 8A and 8B illustrate example process flows to configure a computing system of at least one processor for determining to provide display content with new content in a cold start, in accordance with various embodiments.

FIG. 8A illustrates an example process flow 800 to configure a computing system of at least a processor for providing display content with new items in a cold start in accordance with various embodiments. Sub-process 802 determines that a rate of receipt of queries at a website is higher than a threshold rate. Such a determination may be indicative of spike in interest in a new item from users aware of the new item. The present method provides configuration via sub-process 804, to a computer system to access first content (e.g., news and social media content) to determine that textual features common to the queries are available within the first content. While sub-process 804 illustrates the use of textual features and a search of text, the use of image features, frame features, and audio samples are appropriate to match from query image, video, or audio data to similar media in the first content.

Access to the first content may be by crawling and analyzing news and social media content to determine that the textual features common to the queries are available in text within such news or social media content. Specific news or social media content, when found, are likely to describe a new item that is subject of the received queries. The specific news or social media webpages are then additionally crawled or parsed for identifiers, such as hyperlinks. Such a determination of identifiers is performed via sub-process 806. For example, sub-process 806 determines that an identifier exists within one of the first content. The identifier is a reference (e.g., hyperlink) to a second webpage that includes details associated with the textual features—e.g., new product information or specification.

The hyperlinks within the individual one of the news or social media webpages may provide access to webpages that are specifications and/or product release information webpages (e.g., hyperlinks to open or securely held manufacturer's or retailer's product release webpages). The specifications and/or product release information webpages provide item details for the new item intended as responsive to the queries. The computer system may be configured to index the hyperlink and the related webpages or a summary of the information contained therein. In sub-process 808, a determination is made as to whether a further content query comprising the textual features is received in the website. This further content query may be to the newly released item in the electronic marketplace or auction website, and may be received subsequent or concurrent with the spike of queries. When the further content query is not for the newly released content—e.g., does not include the textual features, then the process 800 performs sub-process 802 for monitoring the rate of receipt of queries for spikes. When the further content query is for the newly release content, then the website, via sub-process 810, generates the display content with areas for responsive information to the content query. The responsive information includes area for previous content that may be responsive to the content query from prior users' behaviors and an allocated area from new content. For example, instead of a static results webpage, the display content is dynamic and includes areas or slots for existing content and for at least one additional slot or area for dynamic modification. Sub-process 812 provides dynamic modification to the display content to comprise information—e.g., a portion of the new content, and an identifier of the source of the new content. The portion of the new content may be provided in a manner indicative as borrowed from the source—e.g., in quotes or as an image excerpt or screenshot—thereby providing a look and feel improvement over a static results webpage.

Figure 8B:
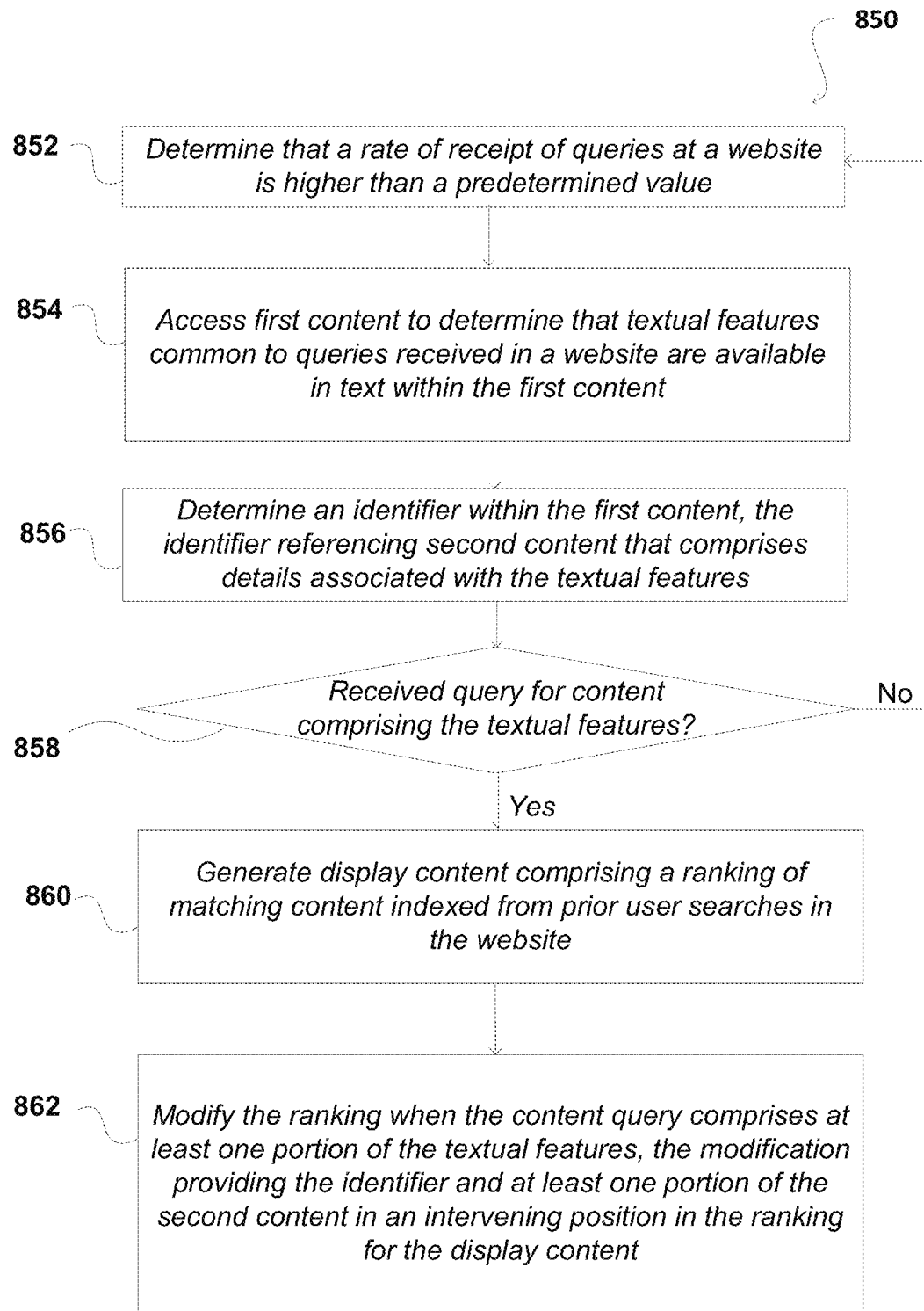

FIG. 8B illustrates an example process flow 850 to configure a computing system of at least one processor for determining to provide display content with new content in a cold start, in accordance with various embodiments. Sub-process 852 determines that a rate of receipt of queries at a website is higher than a threshold rate. Such a determination may be indicative of spike in interest in a new item from users aware of the new item. The present method provides configuration via sub-process 854, to a computer system to access first content (e.g., news and social media content) to determine that textual features common to the queries are available within the first content. While sub-process 854 illustrates the use of textual features and a search of text, the use of image features, frame features, and audio samples are appropriate to match from query image, video, or audio data to similar media in the first content. Access to the first content may be by crawling and analyzing news and social media content to determine that the textual features common to the queries are available in text within such news or social media content. Specific news or social media content, when found, are likely to describe a new item that is a subject of the queries. The specific news or social media webpages are then additionally crawled or parsed for identifiers, such as hyperlinks. Sub-process 856 performs a determination for an identifier within the first content. The identifier referencing second content associated with the textual features. For example, sub-process 856 determines that an identifier exists within one of the first content. The identifier is a reference (e.g., hyperlink) to a second webpage that includes details associated with the textual features—e.g., new product information or specification.

The hyperlinks within the individual one of the news or social media webpages may provide access to webpages that are specifications and/or product release information webpages (e.g., hyperlinks to open or securely held manufacturer's or retailer's product release webpages). The specifications and/or product release information webpages provide item details for the new item intended as responsive to the queries. The computer system may be configured to index the hyperlink and the related webpages or a summary of the information contained therein. In sub-process 858, a determination is made as to whether a further content query comprising the textual features is received in the website. When the further content query is not for the newly released content—e.g., does not include the textual features, then the process 850 performs sub-process 852 for monitoring the rate of receipt of queries for spikes. When the further content query is for the newly release content, then the website generates, via sub-process 860, the display content with areas for responsive information to the content query.

The further content query may be directed to the newly released item in the electronic marketplace or auction website, and may be received subsequent or concurrent with the spike of queries. In response to a content query received in the website, sub-process 860 generates display content comprising a ranking of matching content indexed from prior user searches in the website. Sub-process 862 modifies the ranking when the content query includes at least one portion of the textual features. For example, the modification provides the identifier and at least one portion of the second content in an intervening position in the ranking for the display content. As described previously, the modification may change a rank of an existing matching content indexed from the prior user searches by a ranking to the new item to intervene in the ranking. In one aspect, such a ranking may incorporate a new item in the place of the existing matching content. Alternatively, the ranking to the new item places it above the ranking of the existing matching content by a rank value that indicates a top page listing—e.g., ranking of "0."

Figure 9:
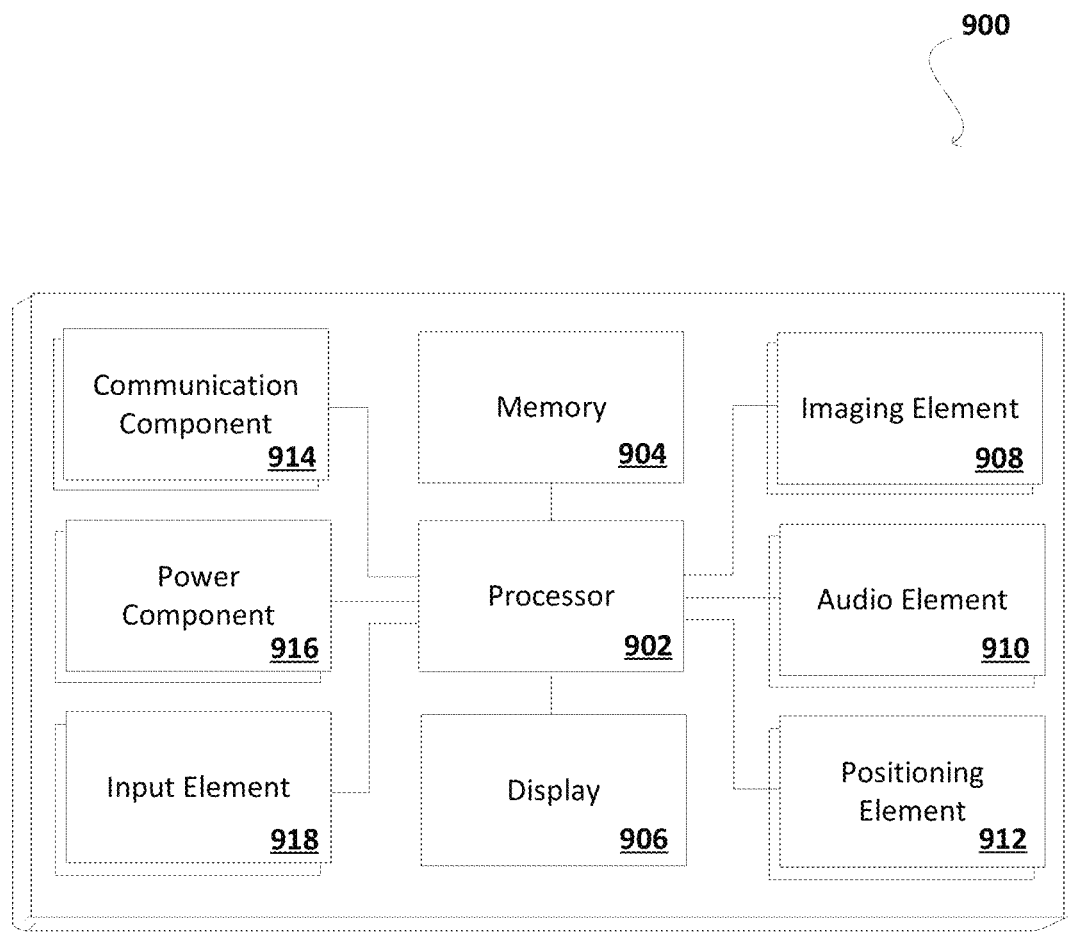
FIG. 9 illustrates example components of a computing device that can be utilized in accordance with various embodiments.

FIG. 9 illustrates a logical arrangement of a set of general components of an example computing device 900 that can be used to implement aspects of the various embodiments. In this example, the device includes a processor 902 for executing instructions that can be stored in a memory device or element 904. As would be apparent to one of ordinary skill in the art, the device 900 can include many types of memory, data storage, or non-transitory computer-readable storage media, such as a first data storage for program instructions for execution by the processor 902, a separate storage for images or data, a removable memory for sharing information with other devices, etc. The device may include a position element 912 to provide positioning for updated results based on geographic position of the device 900. The device 900 will include some type of display element 906, such as a touch screen or liquid crystal display (LCD), although devices such as portable media players might convey information via other means, such as through audio speakers. As discussed, the device in many embodiments will include at least one input element 918 that is able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands using imaging element 908 and audio element 910, such that a user can control the device without having to be in contact with the device. In some embodiments, the computing device 900 of FIG. 9 can include one or more network interface elements 908 for communicating over various networks, such as a Wi-Fi, Bluetooth, RF, wired, or wireless communication systems. The device in many embodiments can communicate with a network, such as the Internet using communication component 914, and may be able to communicate with other such devices using this same or a similar component. Components 902-914 and 918 may be powered by power component 916 using internal or, in combination with, an external power supply.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof using communication component 914.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server will include an operating system that provides executable program instructions for the general administration and operation of that server, and will include a non-transitory computer-readable medium storing instructions that, when executed by a processor of the server, allow the server to perform its intended functions. Suitable implementations for the operating system and functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python®, or Tool Command Language (TCL), as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices will also include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a plurality of queries for content in a website;
   determining that a rate of receipt of the plurality of queries is higher than a threshold rate;
   accessing first content external to the website, the first content comprising a query from the plurality of queries;
   determining that at least one identifier in the first content provides access to second content that comprises content details associated with the plurality of queries;
   retrieving the at least one identifier;
   in response to a content query, generating display content comprising a first area with content results corresponding to the content query based on prior user searches excluding the plurality of queries and comprising a second area;
   determining that the content query comprises at least a portion of the content details; and
   dynamically modifying the display content to comprise, in the second area, the at least one identifier and at least one portion of the second content.

2. The computer-implemented method of claim 1, further comprising:
   determining that the query is associated with a content category based on a classification of at least one portion of the query in a classified dataset providing categories and related content;
   determining category-specific content that are in the content category; and
   accessing the category-specific content to identify the first content.

3. The computer-implemented method of claim 1, further comprising:
   providing the display content to render on a client device;
   receiving a request for new content information based at least in part on a script rendered with the display content; and
   providing the at least one portion of the second content and the at least one identifier to modify the display content in response to the receiving the request for new content information.

4. The computer-implemented method of claim 1, further comprising:
   parsing the at least one identifier to determine a domain and a landing page in the domain;
   determining that the domain belongs to an entity based at least in part on a comparison of the domain with a database of entities' domains;
   determining a credibility score associated with the entity based at least in part on timing of a release publication within the domain being within a predetermined range of a timing of publication of at least a portion of the first content; and
   when the credibility score exceeds a threshold value, providing the at least one identifier in the second area.

5. The computer-implemented method of claim 4, further comprising:
   parsing the first content to select sets of contiguous words;
   searching the first content for the sets of contiguous words;
   when a match is found for at least one set of contiguous words, incrementing a count; and
   weighing the credibility score favorably for the domain when the count is more than a predefined number.

6. The computer-implemented method of claim 4, further comprising:
   determining the timing of the news release from a printed time on a release publication of the first content or from a time of indexing provided by a web crawler that indexes for a portion of the first content; and
   providing the printed time or the time of indexing to adjust the predetermined range.

7. A system, comprising:
   at least one processor; and
   a memory device including instructions that, when executed by the at least one processor, cause the system to:
     determine that a rate of receipt of queries received by a website is higher than a threshold rate;

access first content to determine that textual features common to the queries are available in text within the first content;

determine an identifier within the first content, the identifier referencing second content associated with the textual features;

in response to a content query received in the website, generate display content comprising a ranking of matching content indexed from prior user searches in the website; and modify the ranking when the content query comprises at least one portion of the textual features, the modification providing the identifier and at least one portion of the second content in an intervening position in the ranking for the display content.

8. The system of claim 7, wherein the intervening position is a predetermined area in the ranking of the display content to improve visibility of the identifier and at least one portion of the second content in the display content.

9. The system of claim 7, wherein the instructions, when executed by the at least one processor, further cause the system to:

determine that the textual features are associated with a content category based on a classification of the textual features in a classified dataset providing categories and related terms;

determine category-specific first content that are in the content category; and access the category-specific first content to identify the first content.

10. The system of claim 7, wherein the instructions, when executed by the at least one processor, further cause the system to:

provide the display content to render on a client device; and receive a request for the second content based at least in part on a script rendered with the display content.

11. The system of claim 7, wherein the first content is news webpages and wherein the instructions, when executed by the at least one processor, further cause the system to:

parse the identifier to determine a domain and a landing page in the domain;

determine that the domain belongs to an entity associated with the second content based at least in part on a comparison of the domain with a database of entities' domains;

determine a credibility score associated with the entity based at least in part on timing of a release publication within the domain being within a predetermined range of a timing of publication of at least one portion of the first content; and when the credibility score exceeds a threshold value, provide the identifier in the display content.

12. The system of claim 11, wherein instructions, when executed by the at least one processor, further cause the system to:

parse the second content to select sets of contiguous words;

search the release publication for at least one of the sets of contiguous words;

when a match is found, increment a count; and weigh the credibility score favorably for the domain when the count is more than a predefined number.

13. The system of claim 11, wherein instructions, when executed by the at least one processor, further cause the system to:

determine the timing of the release publication from a printed time on the release publication or from a time of indexing provided by a web crawler that indexes new content; and provide the printed time or the time of indexing to adjust the predetermined range.

14. The system of claim 7, wherein instructions, when executed by the at least one processor, further cause the system to:

determine that there is existing content in the website for the queries, the existing content have no interactions; and determine that the queries are to the existing content; and providing a content identifier for the existing content as the identifier for the intervening position in the ranking for the display content.

15. The system of claim 7, wherein instructions, when executed by the at least one processor, further cause the system to:

determine sets of words or phrases from the queries;

determine that two or more sets of words or phrases is same or semantically similar; and determine that the queries comprise the textual features that are common.

16. A non-transitory computer-readable storage medium including instructions that, when executed by at least one processor of a computing system, cause the computing system to:

determine that a rate of receipt of queries received by a website is higher than a threshold rate;

access first content to determine that textual features common to the queries are available in text within the first content;

determine an identifier within the first content, the identifier referencing second content associated with the textual features;

in response to a content query in the website, generate display content comprising a ranking of matching content indexed from prior user searches in the website; and modify the ranking when the content query comprises at least one portion of the textual features, the modification providing the identifier and at least one portion of the second content in an intervening position in the ranking for the display content.

17. The non-transitory computer readable storage medium of claim 16, wherein the instructions, when executed by the at least one processor, further cause the computing system to:

receive a request for content information based at least in part on a script rendered in the display content; and provide the at least one portion of the second content to modify the display content in an area predetermined for the at least one portion of the second content.

18. The non-transitory computer readable storage medium of claim 15, wherein the instructions, when executed by the at least one processor, further cause the computing system to:

parse the identifier to determine a domain and a landing page in the domain;

determine that the domain belongs to an entity based at least in part on a comparison of the domain with a database of entities' domains;

determine a credibility score associated with the entity based at least in part on timing of a release publication within the domain being within a predetermined range of a timing of publication of at least one portion of the second content; and when the credibility score exceeds a threshold value, provide the identifier in the display content.

\* \* \* \* \*